Feb. 16, 1943. P. M. FREER 2,311,530
BRAKE
Filed Jan. 6, 1942
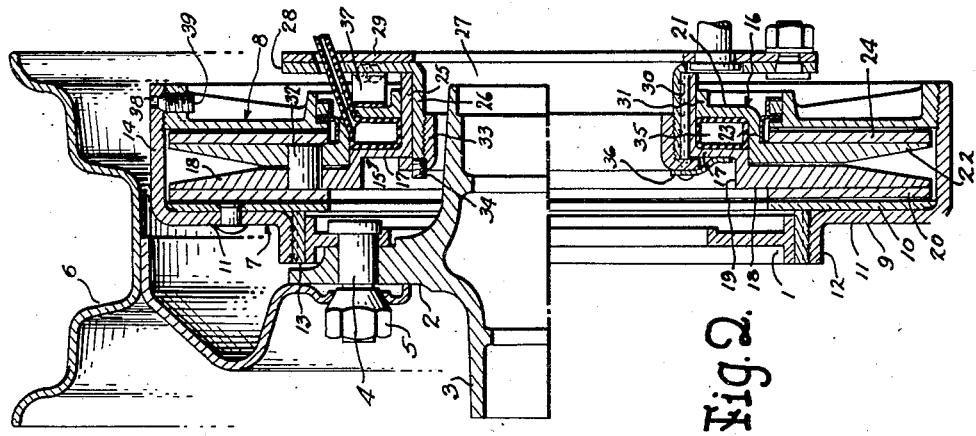
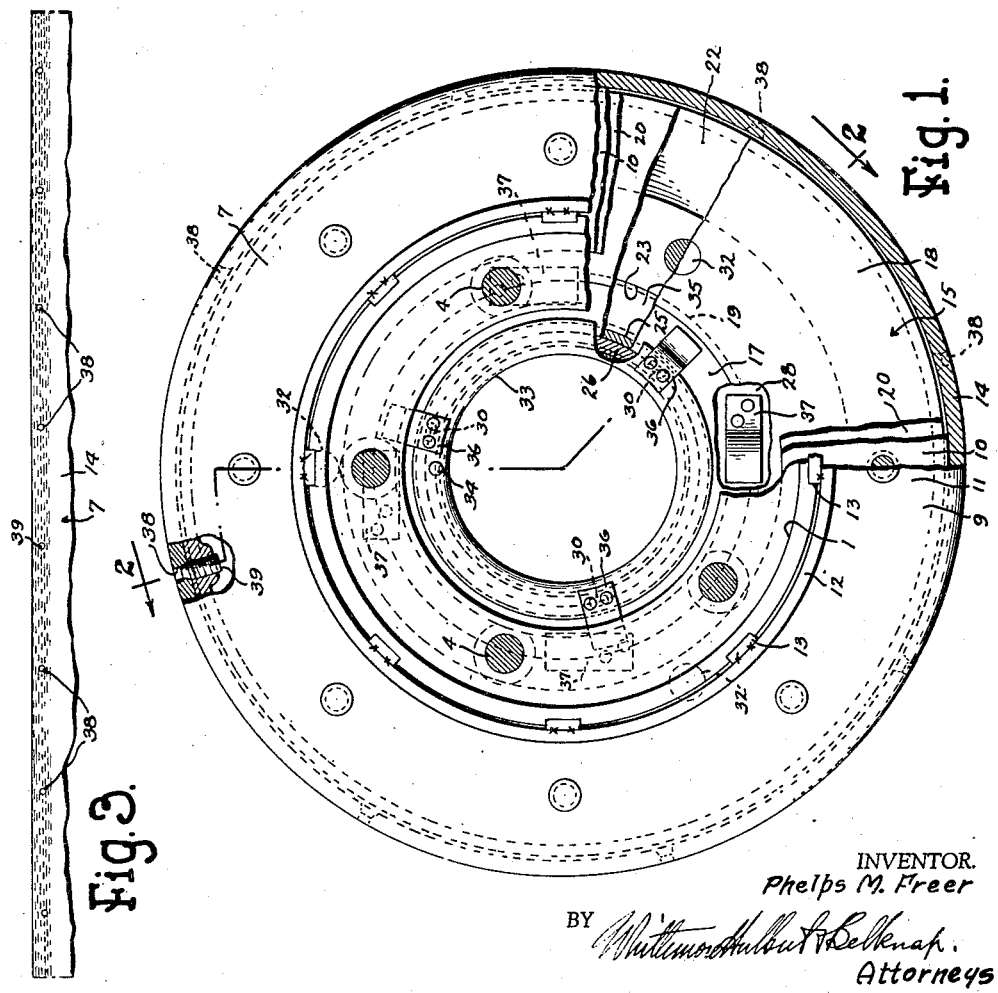
INVENTOR.
Phelps M. Freer Patented Feb. 16, 1943

2,311,530

UNITED STATES PATENT OFFICE 2,311,530

BRAKE

Phelps M. Freer, Detroit, Mich.

Application January 6, 1942, Serial No. 425,791

3 Claims. (Cl. 188—72)

The invention relates to brakes and refers more particularly to disc brakes for use in automobiles, airplanes, and the like.

The invention has for one of its objects to provide a disc brake which is simple in construction and also strong and substantial to withstand the stresses to which it may be subjected.

The invention has for another object to provide a disc brake of that type having a plurality of brake members movable into braking engagement with a plurality of other brake members and constructed to provide clearance between the friction faces of the brake members when in inoperative or non-braking position.

The invention has for a further object to provide an improved construction for compensating for wear of the brake linings.

With these and other objects in view, the invention resides in the novel features of construction and combinations and arrangements of parts as more fully hereinafter set forth.

In the drawing:

Figure 1 is an elevation, partly broken away, of a brake embodying the invention;

Figure 2 is a cross section on the line 2—2 of Figure 1;

Figure 3 is a plan view of a portion of the periphery of one of the brake elements extended.

As illustrated in the drawing, the rotatable element of the brake comprises the T-section member 1, the stem of which is secured to the fixed flange 2 of the wheel hub 3 by the bolts 4 which are adapted to receive the nuts 5 for securing the wheel 6 to the hub. The rotatable element also comprises the outboard and inboard disc brake members 7 and 8 respectively, which are axially slidably mounted on the member 1. More particularly, the outboard brake member 7 comprises the shell 9 and the disc 10, the former being in the nature of a cupped member and the latter being secured as by means of rivets to the web 11 of the former and having a radially extending friction face at its inboard side. The shell has the central annular axially extending flange 12 to which suitable angularly spaced keys 13 are fixedly secured as by welding. The keys extend axially and slidably engage corresponding keyways formed in the radially outer edge of the flange of the web 1. The inboard brake member 8 is generally channel-shaped in cross section and has a radially extending annular friction face on its outboard side opposed to that of the disc 10. The inboard brake member is secured within the free end of the annular flange 14 of the shell 9 so that the inboard and outboard brake members are adapted to move axially as a unit and are also adapted to rotate as a unit.

The non-rotatable element of the brake comprises the oppositely facing outboard and inboard disc brake members 15 and 16, respectively. The outboard brake member 15 has the radially inner and outer disc portions 17 and 18, respectively, connected by the intermediate axial portion 19 and also has secured to the radially outer portion the radially extending brake lining 20 which is opposed to the friction face of the disc 10 of the rotatable brake member 9. The inboard brake member 16 has the radially inner and outer disc portions 21 and 22, respectively, connected by the intermediate axial portion 23 and also has secured to the radially outer portion the radially extending brake lining 24 which is opposed to the friction face of the disc portion of the rotatable brake member 8. The intermediate axial portion 23 encircles and slidably engages the intermediate axial portion 19 and the radially inner portion 21 is axially spaced from the radially inner portion 17. Both the radially outer portions 18 and 22 are preferably of decreasing thickness radially outwardly to their radially outer edges. The outboard brake member 15 is formed with the central annular flange 25 which is sleeved over the annular flange 26 of the collar 27 having the radial flange 28 fixedly secured to the carrier plate 29. The outboard brake member is held from rotation on the collar by suitable means, such as the keys 30 between the annular flanges 25 and 26, the construction being such that the outboard brake member may move axially relative to the collar. The inboard brake member 16 has the central annular flange 31 sleeved on the central annular flange 25 and the inboard brake member is held from rotation relative to the outboard brake member by means of the series of angularly spaced pins 32 preferably having a press fit with the radially outer disc portion 18 and a sliding fit with the radially outer disc portion 22.

33 is a nut threaded into the annular flange 26 of the collar 27 and extending over the outboard edge of the annular flange 26 and the outboard side of the radially inner disc portion 17. The nut limits movement of the non-rotatable outboard brake member in an outboard direction, movement in an inboard direction being limited by the flange 28 of the collar abutting the inboard end of the central annular flange 25 of the outboard brake member. The nut is adjustable relative to the collar to provide for a predetermined axial movement of the non-rotatable outboard brake member and is secured in its desired adjusted positions by suitable means, such as the set screw 34 threaded in the nut and adapted to abut the outboard end of the annular flange of the collar.

The non-rotatable outboard and inboard brake members are adapted to be axially separated by the expansible member or actuator 35, which is in the nature of a fluid pressure operated flexible annular tube preferably formed of rubber. The expansible member is located within the annular space formed by the radially inner disc portions 17 and 21, the intermediate annular flange 23 and the central annular flange 25.

For the purpose of normally holding the parts in their inoperative or non-braking position with clearance between the rotatable and non-rotatable brake members, there are the separate sets of curved springs 36 and 37. Each spring 36 is fixedly secured at one end to the nut 33 and abuts at the other end the radially inner disc portion 17 of the non-rotatable outboard brake member 15 on the side opposite the expansible member 35. Each spring 37 is fixedly secured at one end to the flange 28 of the collar and abuts at its other end the radially inner disc portion 21 of the non-rotatable inboard brake member 16 on the side opposite the expansible member 35. The combined strength of the springs 36 is preferably less than the combined strength of the springs 37. The springs 37 have a limited flexure in an outboard direction so that when they are at rest clearance is preferably provided between the radially outer portions 18 and 22 of the non-rotatable outboard and inboard brake members when the outboard brake member is in its inoperative or non-braking position. This position is determined by engagement of the central annular flange 25 with the radial flange 28 of the collar.

For the purpose of adjusting the rotatable outboard and inboard brake members axially relative to each other to vary the spacing between their friction faces, the free end of the annular flange 14 of the outboard brake member is made in the nature of an internally threaded portion and the radially outer flange of the inboard brake member is made in the nature of an externally threaded portion, the threads having the same pitch. The internally threaded portion is formed with the locking recesses in the nature of radial holes 38 equally spaced about its periphery and successively axially offset to correspond to the lead of the threads of the threaded portions. The externally threaded portion has threaded therein the radial set screw 39 which is adapted to extend into any one of the holes depending upon the rotative position of the inboard brake member relative to the outboard brake member. The construction is such that the clearance between the brake linings and the friction faces when the parts are in inoperative or non-braking position can be readily adjusted by rotating the rotatable inboard brake member 8 relative to the rotatable outboard brake member 7.

In operation, assuming the parts to be in inoperative or non-braking position, it will be seen that upon subjecting the expansible member 35 to braking fluid under pressure the non-rotatable outboard brake member 15 will be first moved in an outboard direction until it abuts the overlapping portion of the nut 33. Then the non-rotatable inboard brake member 16 will be moved in an inboard direction. The movement of the two non-rotatable brake members brings their brake linings 20 and 24, respectively, into engagement with the friction faces of the rotatable outboard and inboard brake members, respectively, both of the latter being mounted to move axially as a unit to assure this result. Upon release of the braking fluid pressure the springs 37 return the non-rotatable inboard brake member to its inoperative position and then the springs 36 return the non-rotatable outboard brake member to its inoperative position, the rotatable outboard and inboard brake members remaining in their relative axial positions. At this time clearance is provided between the brake linings and the friction faces, it being apparent that this clearance may be predetermined.

What I claim as my invention is:

1. In a disc brake, a friction element comprising brake members having friction faces axially spaced from each other, a cooperating friction element comprising brake members extending between said friction faces and movable in opposite directions toward and into engagement with said friction faces, a stationary collar carrying said second mentioned brake members, a nut threaded on said collar and cooperating therewith to limit movement of one of said second mentioned brake members in opposite directions, an actuator for moving said second mentioned brake members toward said friction faces, and spring means for urging said second mentioned brake members away from said friction faces, said spring means including a spring carried by said nut and engaging one of said second mentioned brake members and another spring engaging the other of said second mentioned brake members.

2. In a disc brake, a friction element comprising brake members each having a friction face axially spaced from the other and a threaded portion in engagement with the other, one of said threaded portions having a plurality of locking recesses successively axially offset to correspond to the lead of the threads of said threaded portions, a locking member upon the other of said threaded portions in engagement with one of said recesses, and a friction element between said brake members engageable with said friction faces.

3. In a disc brake, a friction element comprising brake members each having a friction face axially spaced from the other and a threaded portion in engagement with the other, one of said threaded portions having a plurality of generally radial locking holes therethrough successively axially offset to correspond to the lead of the threads of said threaded portions, a generally radially extending set screw threadedly engaging the other of said threaded portions and extending into one of said recesses, and a friction element between said brake members engageable with said friction faces.

PHELPS M. FREER.